(12) United States Patent
Deborne

(10) Patent No.: US 12,128,896 B2
(45) Date of Patent: Oct. 29, 2024

(54) METHOD FOR SECURING A VEHICLE

(71) Applicant: RENAULT s.a.s., Boulogne-Billancourt (FR)

(72) Inventor: Renaud Deborne, Le Chesnay (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 405 days.

(21) Appl. No.: 17/431,915

(22) PCT Filed: Feb. 7, 2020

(86) PCT No.: PCT/EP2020/053096
§ 371 (c)(1),
(2) Date: Aug. 18, 2021

(87) PCT Pub. No.: WO2020/169362
PCT Pub. Date: Aug. 27, 2020

(65) Prior Publication Data
US 2022/0144269 A1    May 12, 2022

(30) Foreign Application Priority Data
Feb. 21, 2019    (FR) .................................. 1901777

(51) Int. Cl.
*B60W 30/14*    (2006.01)
*B60W 30/09*    (2012.01)
(Continued)

(52) U.S. Cl.
CPC ...... *B60W 30/146* (2013.01); *B60W 30/0956* (2013.01); *B60W 30/162* (2013.01);
(Continued)

(58) Field of Classification Search
CPC .......... B60W 30/146; B60W 30/0956; B60W 30/162; B60W 30/18163; B60W 40/04;
(Continued)

(56) References Cited

U.S. PATENT DOCUMENTS 10,703,373 B2 *   7/2020   Fernando ............ B60W 30/188
2016/0159350 A1    6/2016   Pilutti et al.
(Continued)

FOREIGN PATENT DOCUMENTS

DE    10 2015 120 996 A1    6/2016
EP         1 028 241 A1    8/2000
(Continued)

OTHER PUBLICATIONS

International Search Report issued on Jun. 3, 2020 in PCT/EP2020/053096 filed on Feb. 7, 2020, 2 pages.
(Continued)

*Primary Examiner* — Yonel Beaulieu
(74) *Attorney, Agent, or Firm* — Oblon, McClelland, Maier & Neustadt, L.L.P.

(57) ABSTRACT

A method secures a host vehicle circulating on a traffic lane of a road infrastructure including at least one lane adjacent to the traffic lane. The securing method includes, for each adjacent lane: detecting a plurality of vehicles present on the adjacent lane, including an estimate of at least one information item relating to each detected vehicle, including the speed; determining, with the detected vehicles forming a flow of vehicles, a value representing the speed of the flow on the adjacent lane, for example, the average speed; comparing the speed of the host vehicle with the value representing the speed of the flow of vehicles on the adjacent lane; and, if the speed of the host vehicle is greater than a predetermined threshold at the value representing the speed of the flow of vehicles on the adjacent lane, detecting a hazardous situation for the host vehicle.

11 Claims, 3 Drawing Sheets

(51) Int. Cl.
*B60W 30/095* (2012.01)
*B60W 30/16* (2020.01)
*B60W 30/18* (2012.01)
*B60W 40/04* (2006.01)
*B60W 40/10* (2012.01)
*B60W 40/105* (2012.01)
*B60W 50/14* (2020.01)

(52) U.S. Cl.
CPC ...... *B60W 30/18163* (2013.01); *B60W 40/04* (2013.01); *B60W 40/105* (2013.01); *B60W 50/14* (2013.01); *B60W 2520/10* (2013.01); *B60W 2554/4042* (2020.02); *B60W 2554/80* (2020.02)

(58) Field of Classification Search
CPC .............. B60W 40/105; B60W 50/14; B60W 2520/10; B60W 2554/4042; B60W 2554/80; B60W 2050/143; B60W 2554/00; B60W 2554/4041; B60W 2554/801; B60W 2554/803; B60W 2554/804; B60W 30/095; B60W 30/10; B60W 30/08; B60W 40/02; B60W 2050/0005; B60Y 2400/90
See application file for complete search history.

(56) References Cited

U.S. PATENT DOCUMENTS

| | | |
|---|---|---|
| 2018/0061253 A1 | 3/2018 | Hyun |
| 2018/0257660 A1* | 9/2018 | Ibrahim ................ G01S 5/0027 |
| 2020/0062255 A1* | 2/2020 | Fernando ............ B60W 30/188 |
| 2021/0094577 A1* | 4/2021 | Shalev-Shwartz .......................... B60W 30/0953 |

FOREIGN PATENT DOCUMENTS

| | | | | |
|---|---|---|---|---|
| EP | 3640106 A1 * | 4/2020 | ................ | A23J 1/10 |
| FR | 2 787 586 A1 | 6/2000 | | |

OTHER PUBLICATIONS

French Preliminary Search Report (with English translation of Categories of Cited Documents) issued on Nov. 11, 2019 in French Application 1901777 filed on Feb. 21, 2019, 3 pages.

* cited by examiner

METHOD FOR SECURING A VEHICLE

BACKGROUND

The invention relates to a method for securing a vehicle, notably a motor vehicle with driver assistance or a self-driving motor vehicle. The invention also relates to a securing device designed to be used in a motor vehicle, including means for implementing such a method. The invention also relates to a motor vehicle including such a securing device. The invention also relates to a computer program implementing such a method. The invention also relates to a saving medium on which such a program is saved. The invention finally relates to a signal from a data medium containing such a program.

The safety requirements related to the use of self-driving vehicles or vehicles with driver assistance are high. A vehicle with "driver assistance" means a vehicle fitted with an adaptive cruise control (ACC) driver assistance system.

A difficulty related to the use of a self-driving vehicle or a vehicle with driver assistance is as follows: it is possible for the traffic lane in which such a vehicle is traveling to be free if the traffic is fluid in that lane, while the adjacent lanes to the left and/or right are jammed. Such situations can be found on urban freeways or ring roads. Such phenomena may be caused by the presence of an entry lane or an exit lane. This can result in a very marked difference in speed between the vehicle flows in the different traffic lanes. Accordingly, an autonomous vehicle or a vehicle fitted with a cruise control device can be caused to travel at a high setpoint speed, while the vehicles in the adjacent lanes are traveling at low speeds or are stopped. This results in a high collision risk if a vehicle changes lane suddenly.

There are cut-in detection systems used to detect lane changes by vehicles moving into the traffic lane of a self-driving vehicle or a vehicle with driver assistance. Such systems implement different basic criteria, notably predicting the path of vehicles in adjacent lanes, as is described in the document "Cutting-in Vehicle Recognition for ACC Systems—Towards Feasible Situation Analysis Methodology" (Ismail Dagli et al.).

However, these solutions have drawbacks. In particular, such cut-in detection systems are inefficient in lane-passing situations if at least one of the vehicles in the adjacent stopped or very slow moving lane does not individually pose a path-related lane-change risk. The self-driving vehicle or vehicle with driver assistance then passes the lane without slowing. This results in a high collision risk if one of the vehicles changes traffic lane.

BRIEF SUMMARY

The purpose of the invention is to provide a safety device and a method that overcomes the drawbacks mentioned above and improves the devices and methods known in the prior art.

According to the invention, a method for securing a host vehicle traveling in a traveling lane of a road infrastructure comprising at least one lane adjacent to said traveling lane, comprises the following steps for each adjacent lane:
  detecting a plurality of vehicles present in the adjacent lane, including an estimate of at least one information item relating to each detected vehicle, including the speed,
  with the detected vehicles forming a flow of vehicles, determining a value representing the speed of the flow in the adjacent lane, for example, the average speed,
  comparing the speed of the host vehicle with the value representing the speed of the flow of vehicles in the adjacent lane, and
  if the speed of the host vehicle is greater than the value representing the speed of the flow of vehicles in the adjacent lane by a predetermined threshold, detecting a hazardous situation for the host vehicle.

The method may include a step of sending a warning to the driver via a human-machine interface if a situation hazardous for the host vehicle is detected.

The method may include, if a situation hazardous for the host vehicle is detected, a step of calculating a target speed value for the host vehicle corresponding to the speed of the host vehicle less a quantity, that is intended to reduce the risk to the host vehicle.

The method may also include:
  a step of automatically reducing the speed of the host vehicle to said target speed value of the host vehicle, or
  a step of suggesting to the driver of the host vehicle a speed setpoint equal to said target speed value of the host vehicle and, if the driver accepts the suggestion, a step of reducing the speed of the host vehicle to said setpoint value.

For each adjacent lane, detection may also include an estimate of the distance between the host vehicle and the detected vehicles.

In the step of calculating the target speed value for the host vehicle, said quantity can be determined as a function of the distance between the host vehicle and the vehicles detected in the adjacent lane.

In the step of comparing the speed of the host vehicle with the value representing the speed of the flow of vehicles in the adjacent lane, said predetermined threshold can depend on the speed of the host vehicle.

The method may also include a step of changing the traveling lane of the host vehicle in the event of detection of a hazardous situation for the host vehicle.

The invention also relates to a securing device designed to be used in a host vehicle, the securing device comprising hardware and/or software elements implementing the method as defined above, notably hardware and/or software elements designed to implement the method as defined above, and/or the device comprising means for implementing the method as defined above.

The device may include:
  a detection system designed to detect a plurality of vehicles present in at least one adjacent lane, and to estimate at least one information item, notably speed, relating to the detected vehicle,
  a processor designed to determine a value representing the speed of the flow of vehicles in the at least one adjacent lane,
  a speed arbitration system designed to compare the speed of the host vehicle with the value representing the speed of the flow of vehicles in each adjacent lane, and to calculate a target speed value for the host vehicle corresponding to the speed of the host vehicle less a quantity,
  a human-machine interface designed to issue a warning to the driver of the host vehicle.

The invention also relates to a vehicle comprising a securing device as defined above.

BRIEF DESCRIPTION OF THE DRAWINGS

The attached drawings show an example embodiment of a securing device according to the invention and a means of implementing a securing method according to the invention.

DETAILED DESCRIPTION

Figure 1:
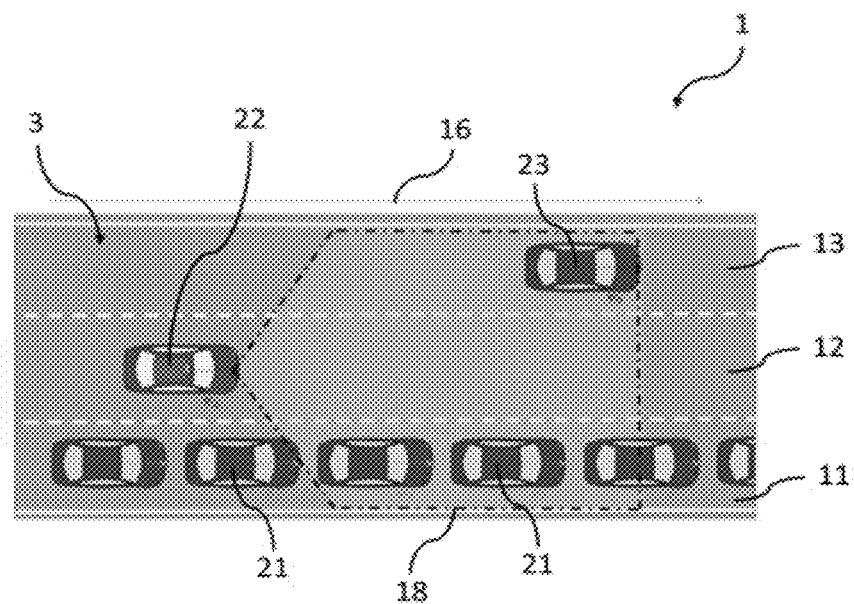
FIG. 1 is a schematic view of a road infrastructure including several traffic lanes.

An example road infrastructure 1 is described below with reference to FIG. 1.

The road infrastructure 1 includes at least one road section 3 or roadway. The road section 3 includes for example three traffic lanes 11, 12, 13. The road section 3 can also include more than three traffic lanes.

A vehicle 22, referred to as the host vehicle, is fitted with a securing device according to the invention. Such a securing device is described in greater detail below. The host vehicle 22 is for example a vehicle with driver assistance fitted with a driver assistance device, notably adaptive cruise control (ACC), or a self-driving vehicle.

The host vehicle 22 is for example traveling in the central traffic lane 12. "Traveling lane" refers to the lane in which the host vehicle 22 is traveling. It is assumed that the vehicle 22 remains in the traveling lane 12.

"Adjacent lanes" refers to any lanes to the left and to the right of the traveling lane 12. In the example in FIG. 1, there are two lanes adjacent to the traveling lane 12 of the host vehicle 22: the traffic lane 11 to the right of the traveling lane 12 and the traffic lane 13 to the left of the traveling lane 12. The direction of travel of the vehicles is indicated by the arrow 16 in FIG. 1.

The example in FIG. 1 shows a situation in which the traffic is congested in the right-hand lane 11, the traffic is fluid in the central traveling lane 12 of the host vehicle 22, and the traffic is also fluid in the left-hand lane 13. The speed of the vehicles 21 traveling in the right-hand lane 11 is low, for example in the order of 10 km/h. The speed of the host vehicle 22 is high, for example in the order of 90 km/h. The speed of the vehicles 23 traveling in the left-hand lane 13 is high, for example in the order of 110 km/h.

The invention is intended to use information, notably information obtained using radars or cameras, to identify the state of the traffic, in particular the speed of the traffic flows, in the lanes adjacent to the traveling lane of a host vehicle, and to suggest a speed reduction to the host vehicle as a function of the speed of the flows of vehicles in the adjacent lanes to secure the initially hazardous situation for the host vehicle. This obviates or minimizes the risk of a collision with a vehicle in an adjacent lane that changes lane. This therefore improves safety in "lane passing" situations.

The invention is not intended to detect or predict a cut-in, i.e. a lane change by a vehicle from an adjacent lane into the traveling lane of the host vehicle. Indeed, a method for securing a vehicle such as the one described below can be implemented in addition to a "cut-in" detection mechanism.

A means of implementing a method for securing a host vehicle 22 is described below with reference to FIG. 2.

In a first step E1 (DETECT), the vehicles 21, 23 in the lanes 11, 13 adjacent to the traveling lane 12 of the host vehicle 22 are detected. At least one information item, notably speed, relating to the vehicles 21, 23 detected in the at least one adjacent lane 11, 13 is also detected. An additional detected information item can be the distance between the host vehicle 22 and each detected vehicle 21, 23. The estimated speed and optionally the estimated distance of each detected vehicle is for example calculated.

In a second step E2 (CALC), for each adjacent lane 11, 13, an estimate of the average speed of the vehicles 21, 23 in the adjacent lane 11, 13 is calculated. For each adjacent lane 11, 13, in which the detected vehicles form a flow of vehicles, a value representing the speed $v_1$, $v_3$ of the flow of vehicles in the adjacent lane 11, 13 is calculated, for example on the basis of the estimated average speed of the vehicles 21, 23 in the adjacent lane 11, 13. The speed $v_1$ of the flow of vehicles in the right-hand lane 11 and the speed $v_3$ of the flow of vehicles in the left hand lane 13 are for example calculated.

"Speed of the flow of vehicles" or "value representing the speed of the flow of vehicles" for example means the average speed of the different vehicles detected in a given adjacent traffic lane, or the median speed. "Median speed" means a speed value at which the number of vehicles detected by the host vehicle traveling at a speed greater than this value is equal to the number of vehicles traveling at a speed less than this same value.

In a third step E3 (COMP), the speed $v_2$ of the host vehicle 22 is compared with the speed $v_1$, $v_3$ of the flow of vehicles in each adjacent lane 11, 13.

A threshold is defined in advance for each adjacent lane 11, 13. The threshold of the adjacent lane 11 is $\text{Threshold}_{v_1}$ and the threshold of the adjacent lane 13 is $\text{Threshold}_{v_3}$.

For each adjacent lane 11, 13, the speed $v_2$ of the host vehicle 22 is compared with the sum $v_1 + \text{Threshold}_{v_1}$, $v_3 + \text{Threshold}_{v_3}$ of the speed $v_1$, $v_3$ of the flow of vehicles in the adjacent lane 11, 13 and the corresponding threshold $\text{Threshold}_{v_1}$, $\text{Threshold}_{v_3}$.

Preferably, the thresholds $\text{Threshold}_{v_1}$ and $\text{Threshold}_{v_3}$, corresponding respectively to the adjacent right-hand lane 11 and the adjacent left-hand lane 13, can be calibrated in the form of parameter data of the method, preferably not accessible to the driver.

The thresholds $\text{Threshold}_{v_1}$, $\text{Threshold}_{v_3}$ of each adjacent lane 11, 13 can be predefined constants or, in a preferred variant, are variable and selected as a function of context, notably of speed $V_2$ of the host vehicle 22 and potentially of the distance between the host vehicle and the adjacent vehicles detected.

If for at least one adjacent lane 11, 13, the speed $v_2$ of the host vehicle 22 is greater than the sum $v_1 + \text{Threshold}_{v_1}$, $v_3 + \text{Threshold}_{v_3}$ of the speed $v_1$, $v_3$ of the flow of vehicles in the adjacent lane 11, 13 and the corresponding threshold $\text{Threshold}_{v_1}$, $\text{Threshold}_{v_3}$, then the situation is deemed to be dangerous or hazardous. The securing method then implements a first detection phase of a dangerous situation. This situation occurs in particular when the vehicles in a given adjacent lane are traveling at low speed.

In a fourth step E4, which represents a second phase of the securing method, the method makes the situation safe again. One solution rests notably on an adjustment of the speed of the host vehicle 22 that is automatic or based on a simple suggestion to the driver.

The step E4 can be executed according to different variants as a function of the driving mode, notably autonomous or assisted, of the host vehicle 22. The method preferably in all cases includes a first sub-step E10, E20 of sending a warning to the driver of the dangerous situation detected.

The method implements another sub-step of calculating a new value, referred to as the target speed value, for the host vehicle 22, which is the speed $v_2$ of the host vehicle less a quantity $\Delta_v$.

The quantity $\Delta_v$ may for example be determined as a function of the distance between the host vehicle and the low speed vehicles detected in the adjacent lane. The greater the distance between the host vehicle and the vehicles detected in the adjacent lane, the lower the quantity $\Delta_v$. The risk to the host vehicle is low because the detected vehicles are far away. The lesser the distance between the host vehicle and the vehicles detected in the adjacent lane, the greater the quantity $\Delta_v$, tending towards the maximum value thereof. Indeed, the risk to the host vehicle is high.

With self-driving, in the sub-step E11 of the step E4, the speed of the host vehicle 22 is automatically adjusted according to the equation $v_2=v_2-\Delta_v$. The speed of the host vehicle 22 is automatically reduced by a quantity $\Delta_v$ determined during the step E3. In the sub-step E10 of the step E4, the driver of the host vehicle 22 is warned that this new speed setpoint has been applied to the vehicle.

With driver assistance, in a sub-step E20 of step E4, the driver is warned that, for at least one adjacent lane 11, 13, the speed $v_2$ of the host vehicle 22 is greater than the sum $v_1+\text{Threshold}_{v_1}$, $v_3+\text{Threshold}_{v_3}$ of the speed $v_1$, $v_3$ of the flow of vehicles in the adjacent lane 11, 13 and the corresponding threshold $\text{Threshold}_{v_1}$, $\text{Threshold}_{v_3}$. A new speed setpoint $v_2=v_2-\Delta_v$ is suggested to the driver. If the driver accepts this new speed setpoint, the new speed setpoint is then applied to the vehicle in a sub-step E21 of step E4, which reduces the speed of the host vehicle 22 by a quantity $\Delta_v$ determined during step E3. If the driver does not accept this new speed setpoint, the speed of the host vehicle 22 remains unchanged.

In the example in FIG. 1, in the second step E2, the speed $v_1$ of the flow of vehicles in the right-hand lane 11 is estimated. Since the speed $v_2$ of the host vehicle 22 is greater than the speed $v_1$ of the vehicles in the right-hand lane 11, the speed setpoint $v_2$ of the self-driving system or of the adaptive cruise control of the host vehicle 22 is reduced by a given quantity $\Delta_v$. For example, the speed $v_2$ of the host vehicle 22 is reduced by a quantity $\Delta_v$ in the order of 30 km/h. The speed of the host vehicle 22 is reduced automatically in self-driving mode and following confirmation from the driver in driver assistance mode.

Figure 2:
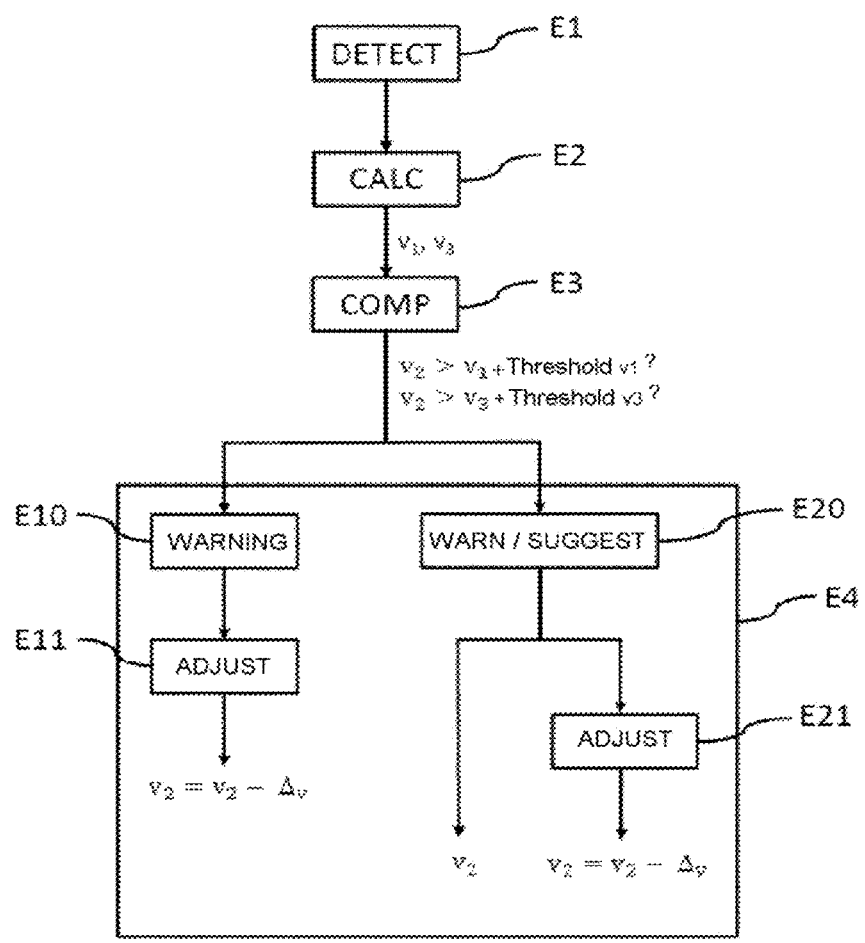
FIG. 2 is a flow diagram of a means of implementing a method for securing a vehicle.

A method such as the one described in relation to FIG. 2 warns the driver of the host vehicle 22 if there is a significant speed difference between the flow of vehicles in the adjacent lanes and the host vehicle 22. These warnings warn the driver of the host vehicle of a potentially hazardous situation, thereby maintaining or increasing the driver's level of vigilance. Such a method in particular makes lane-passing situations more safe.

A second effect of a method of the type described in relation to FIG. 2 can be to reduce the speed of the host vehicle, even if there are no vehicles in the traveling lane of the host vehicle. Such a method anticipates and reduces the effects of potential braking in the event of incorporation of a vehicle changing traffic lane from an adjacent, slower-moving lane. In the example in FIG. 1, the vehicles 21, 23 in adjacent lanes 11, 13 that are detected during the step E1 of the method are the vehicles between the dotted lines 18. For example, if step E1 of the method makes it possible to detect vehicles in the adjacent lanes over a two-second period, the host vehicle 22 can use this time to start slowing down in order to approach the vehicle in the adjacent lanes with a speed difference compatible with the previously defined criteria.

One advantage of a method for securing a vehicle of the type described in relation to FIG. 2 is related to the fact that the driver of the vehicle is able to better anticipate a potentially hazardous event, for example a vehicle changing lane, or a door being opened if a flow of vehicles in a detected adjacent lane is stopped.

Another advantage of a method for securing a vehicle of the type described in relation to FIG. 2 is related to the fact that the difference in speed between the host vehicle and all other vehicles in adjacent lanes that are liable to change lane is reduced. This results in a reduction of the effects of a potential collision.

Figure 3:
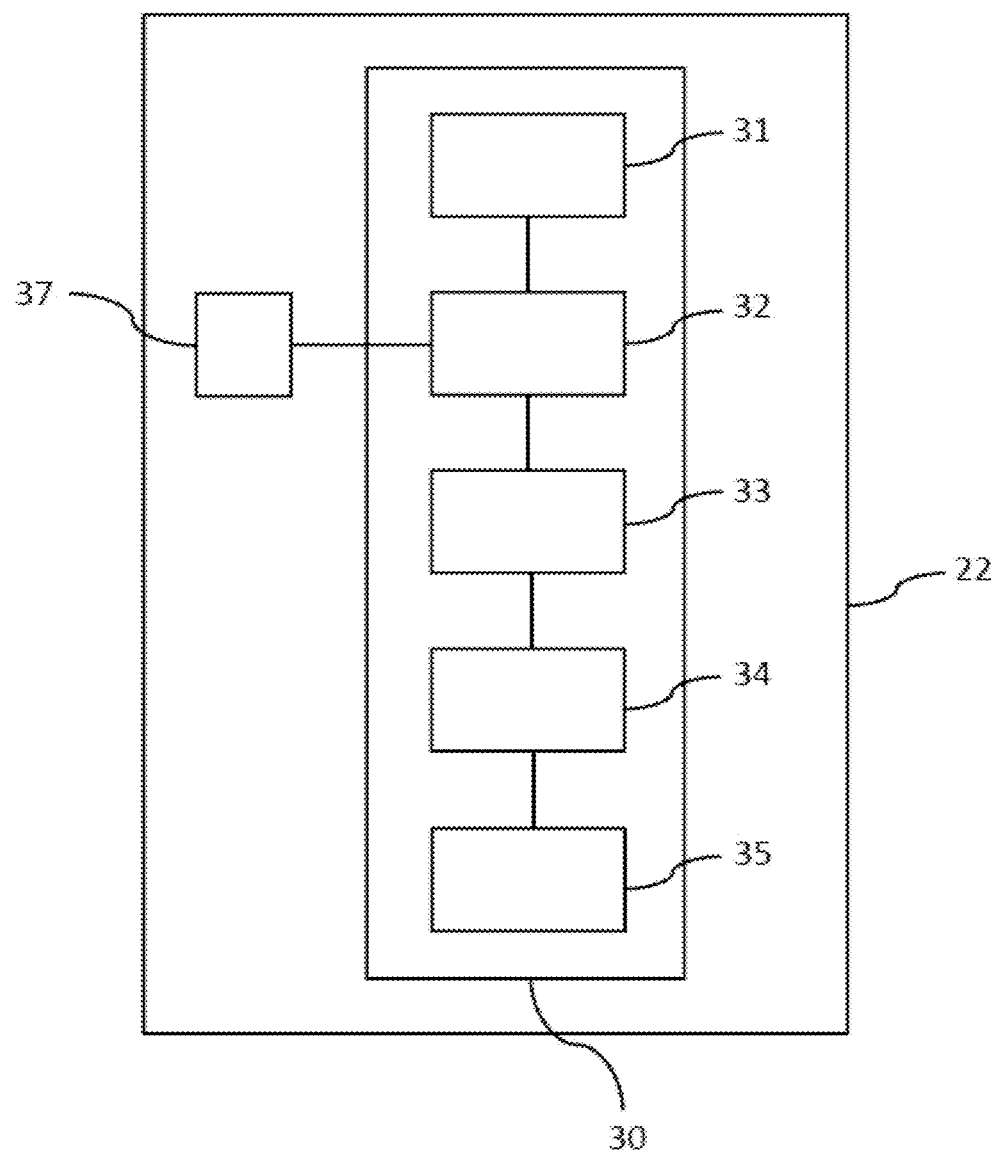
FIG. 3 shows an embodiment of a securing device of a vehicle.

One embodiment of a device 30 for securing a vehicle 22 is described below with reference to FIG. 3.

The securing device 30 comprises the hardware and/or software elements 31, 32, 33, 34, 35, 37 implementing or governing a securing method of the type described above. In particular, the securing device 30 includes the hardware and/or software elements required to implement the steps of the method for securing a host vehicle 22. These different elements can include software modules.

For example, the hardware and/or software elements may include some or all of the following elements:

a detection system 31,
a processor 32,
a speed arbitration system 33,
a human-machine interface (HMI) 34,
a memory 35.

The detection system 31 is used to detect vehicles in the different traffic lanes, notably in the traveling lane 12 and in the adjacent lanes 11, 13. The detection system 31 detects at least one information item, notably speed and/or distance, relating to the vehicles 21, 23 detected in the at least one adjacent lane 11, 13.

The detection system 31 can include a radar and/or a camera.

In addition to the information provided by the detection system 31, information relating to the state of the traffic, notably from mapping, can also be used. The host vehicle 22 can advantageously include a mapping database 37.

The processor 32 can be used to estimate the average speed of the vehicles 21, 23 in the at least one adjacent lane 11, 13, and to determine the speed $v_1$, $v_3$ of the corresponding flow of vehicles.

The speed arbitration system 33 is used to determine, on the basis of the speed $v_2$ of the host vehicle 22 and the speed $v_1$, $v_3$ of the flow of vehicles in the at least one adjacent lane 11, 13 provided by the processor 32, the new speed setpoint to be applied to the host vehicle 22.

In self-driving mode, the human-machine interface (HMI) 34 warns the driver of the host vehicle 22 that a new speed setpoint has been applied. In driver assistance mode, the human-machine interface (HMI) 34 warns the driver of the host vehicle 22 if there is a significant speed difference between the flow of vehicles in the adjacent lanes and the host vehicle 22, and suggests a new speed setpoint to the driver.

A method and a securing device have been described above in relation to a motor vehicle. Such a method and such a securing device may be used in other types of road transport, for example two-wheeled vehicles, buses or goods transport vehicles.

The invention claimed is:

1. A method for securing a host vehicle traveling in a traveling lane of a road infrastructure comprising at least one lane adjacent to said traveling lane, the securing method comprising for each adjacent lane:

detecting a plurality of vehicles present in the adjacent lane, including an estimate of at least one information item relating to each detected vehicle, including the speed;

determining, with the detected vehicles forming a flow of vehicles, a value representing the speed of the flow in the adjacent lane;

comparing the speed of the host vehicle with the value representing the speed of the flow of vehicles in the adjacent lane;

detecting, when the speed of the host vehicle is greater than the value representing the speed of the flow of vehicles in the adjacent lane by a predetermined threshold, a hazardous situation for the host vehicle; and sending, to secure the host vehicle, a warning to a driver via a human-machine interface when the hazardous situation is detected.

2. The method as claimed in claim 1, further comprising, when the hazardous situation is detected, calculating a target speed value for the host vehicle corresponding to the speed of the host vehicle less a quantity that is determined to reduce the risk to the host vehicle.

3. The method as claimed in claim 2, further comprising:

automatically reducing the speed of the host vehicle to said target speed value of the host vehicle, or suggesting to the driver of the host vehicle a speed setpoint equal to said target speed value of the host vehicle and, when the driver accepts the suggestion, reducing the speed of the host vehicle to said setpoint value.

4. The method as claimed in claim 1, in which, for each adjacent lane, the detecting the plurality of vehicles present in the adjacent lane also includes an estimate of the distance between the host vehicle and the detected vehicles.

5. The method as claimed in claim 2, in which, for each adjacent lane, the detecting the plurality of vehicles present in the adjacent lane also includes an estimate of the distance between the host vehicle and the detected vehicles, and in which the calculating the target speed value for the host vehicle includes determining said quantity as a function of the distance between the host vehicle and the vehicles detected in the adjacent lane.

6. The method as claimed in claim 1, in which the comparing the speed of the host vehicle with the value representing the speed of the flow of vehicles in the adjacent lane includes said predetermined threshold depending on the speed of the host vehicle.

7. The method as claimed in claim 1, further comprising changing the traveling lane of the host vehicle in an event of detecting the hazardous situation for the host vehicle.

8. The method as claimed in claim 1, wherein the value representing the speed of the flow in the adjacent lane is an average speed.

9. A securing device configured to be used in a host vehicle, the securing device comprising:

software and/or hardware elements that are configured to implement the method as claimed in claim 1.

10. The device as claimed in claim 9, wherein the software and/or hardware elements comprise:

a detection system configured to detect a plurality of vehicles present in at least one adjacent lane, and to estimate a speed of the detected vehicle;

a processor configured to determine a value representing the speed of the flow of vehicles in the at least one adjacent lane;

a speed arbitration system configured to compare the speed of the host vehicle with the value representing the speed of the flow of vehicles in each adjacent lane, and to calculate a target speed value for the host vehicle corresponding to the speed of the host vehicle less a quantity; and a human-machine interface configured to issue the warning to the driver of the host vehicle.

11. A vehicle comprising the securing device as claimed in claim 9.

* * * * *